(12) United States Patent
Yoshikawa et al.

(10) Patent No.: US 8,159,106 B2
(45) Date of Patent: Apr. 17, 2012

(54) MOTOR AND ELECTRONIC APPARATUS USING THE SAME

(75) Inventors: Yuichi Yoshikawa, Osaka (JP); Hiroaki Kawasaki, Osaka (JP); Kenji Sugiura, Osaka (JP); Hiroshi Ueda, Kyoto (JP); Hiroki Asai, Hyogo (JP)

(73) Assignee: Panasonic Corporation, Osaka (JP)

( * ) Notice: Subject to any disclaimer, the term of this patent is extended or adjusted under 35 U.S.C. 154(b) by 160 days.

(21) Appl. No.: 12/813,201

(22) Filed: Jun. 10, 2010

(65) Prior Publication Data

US 2010/0327691 A1  Dec. 30, 2010

(30) Foreign Application Priority Data

Jun. 25, 2009  (JP) ................................ 2009-151269

(51) Int. Cl.
  *H02K 1/00* (2006.01)
(52) U.S. Cl. ........ 310/216.111; 310/68 B; 310/216.097; 310/216.074
(58) Field of Classification Search ............... 310/68 B, 310/156.01, 156.05, 156.06, 216.111, 216.097, 310/216.091, 216.064, 216.074
See application file for complete search history.

(56) References Cited

U.S. PATENT DOCUMENTS

| | | | | |
|---|---|---|---|---|
| 4,755,701 A | * | 7/1988 | Shikama | 310/156.05 |
| 5,245,234 A | * | 9/1993 | Okada et al. | 310/51 |
| 5,408,153 A | * | 4/1995 | Imai et al. | 310/68 B |
| 5,410,201 A | * | 4/1995 | Tanaka et al. | 310/68 B |
| 5,604,389 A | * | 2/1997 | Nitta et al. | 310/67 R |
| 5,798,583 A | * | 8/1998 | Morita | 310/216.111 |
| 6,759,784 B1 | * | 7/2004 | Gustafson et al. | 310/254.1 |
| 6,979,931 B1 | * | 12/2005 | Gustafson et al. | 310/254.1 |
| 7,242,121 B2 | * | 7/2007 | Kadowaki | 318/400.04 |
| 8,067,870 B2 | * | 11/2011 | Kobayashi et al. | 310/156.05 |
| 2002/0195888 A1 | * | 12/2002 | Utsumi | 310/67 R |
| 2006/0006747 A1 | | 1/2006 | Kadowaki | |
| 2006/0197402 A1 | | 9/2006 | Gomyo et al. | |
| 2010/0237752 A1 | * | 9/2010 | Yoshikawa et al. | 310/68 B |
| 2010/0314965 A1 | | 12/2010 | Yoshikawa et al. | |
| 2010/0327692 A1 | | 12/2010 | Yoshikawa et al. | |

FOREIGN PATENT DOCUMENTS

| | | |
|---|---|---|
| JP | 9-285044 | 10/1997 |
| JP | 2006-25537 | 1/2006 |
| JP | 2007-244004 | 9/2007 |

* cited by examiner

*Primary Examiner* — Dang Le

(74) *Attorney, Agent, or Firm* — Hamre, Schumann, Mueller & Larson, P.C.

(57) ABSTRACT

A stator 13 on whose outer circumference a plurality of magnetic poles 13a are arranged is mounted on a substrate 11, and a rotor 14 is rotatably disposed around the stator. The inner circumferential face of the rotor is provided with a magnet 15 magnetized to have alternately opposite polarities in a direction opposing the stator, and magnetized to have alternately opposite polarities in a direction opposing the substrate. The outer circumferential ends of the magnetic poles of the stator are provided with a first extended portion 13c that extends from a magnetic pole base 13d to the substrate side, and a second extended portion 13b that extends from the magnetic pole base to a side opposite the substrate side. A face of the substrate opposing the rotor is provided with a FG pattern 19 outside the outer circumferential face of the stator such that the FG pattern opposes the magnet. Accordingly, it is possible to improve the precision in detecting the rotational speed by reducing noise superimposed on the FG signal, while securing a high driving efficiency.

8 Claims, 12 Drawing Sheets

MOTOR AND ELECTRONIC APPARATUS USING THE SAME

BACKGROUND OF THE INVENTION

1. Field of the Invention

The present invention relates to a motor and an electronic apparatus using the same.

2. Description of the Related Art

In electronic apparatuses such as laser printers, a paper feed roller (driven member) provided in a main body case is coupled via a deceleration mechanism to a driving shaft of a motor. When this motor is driven, the paper feed roller rotates and feeds paper to a predetermined portion.

As this motor, a brushless DC motor that ordinarily is used includes: a stator on whose outer circumference a plurality of magnetic poles are arranged at a first predetermined interval; and a rotor that is rotatably disposed around the stator; wherein an inner circumferential face of the rotor is provided with a magnet magnetized to have opposite polarities at a second predetermined interval (main magnetization).

In this sort of motor, ordinarily in order to arrange the magnet of the rotor as close as possible to a magnetism-detecting element that magnetically detects rotation of the rotor, the size of the magnet in a direction parallel to a motor-driving shaft is set larger than the size of a magnetic pole base of the stator in the same direction. In this case, an extended portion, called an "end plate", that extends in a direction substantially parallel to the magnet often is formed on both sides of a magnetic pole base, at outer circumferential ends of the magnetic poles of the stator (see JP H9-285044A and JP 2007-244004A, for example). Accordingly, the area in which the magnet of the rotor and the magnetic poles of the stator oppose each other increases, and, thus, the driving force and the driving efficiency of the motor can be increased.

Furthermore, for example, in the case where a paper feed roller of a laser printer is driven via a deceleration mechanism, the rotation of a brushless DC motor has to be controlled precisely. Accordingly the rotational speed of the brushless DC motor has to be detected at a certain level of resolution.

As a speed-detecting method appropriate for this sort of purpose, a FG method (described later) ordinarily is used. That is to say, the magnet of the rotor is magnetized to generate a torque (main magnetization), and, moreover, multi-pole magnetization (FG magnetization) in a direction opposing the substrate is performed on a face of the magnet opposing a substrate. Furthermore, the substrate is provided with a FG pattern in the circumferential direction, in which linear elements in the same number as that of magnetized poles of the FG magnetization are connected in series. When the rotor rotates, an induced voltage is generated at the linear elements due to magnetic fluxes obtained by the FG magnetization, and a speed detection signal (FG signal) at a frequency proportional to the rotations of the motor can be obtained through this FG pattern.

In this sort of FG method, in order to reduce the influence of the main magnetization, there is a known method for canceling the influence of the main magnetization, by configuring the FG pattern from a main pattern and a cancellation pattern and connecting the main pattern and the cancellation pattern in series (see JP 2006-25537A, for example).

However, in the case where an extended portion that extends in a direction substantially parallel to the magnet is provided at outer circumferential ends of the magnetic poles of the stator, it may be difficult to cancel the influence of magnetic fluxes obtained by the main magnetization in the above-described FG method. The reason is as follows. The extended portion provided at the outer circumferential ends of the magnetic poles has a magnetism collecting effect, and, thus, magnetic fluxes obtained by the main magnetization are drawn easily into the extended portion. Accordingly, in the radial direction, the influence of the main magnetization on a portion of the FG pattern close to the stator is different from the influence of the main magnetization on a portion away from the stator, and the influence of magnetic fluxes obtained by the main magnetization cannot be canceled sufficiently. As a result, noise is superimposed on the FG signal, and the precision in detecting the rotational speed is lowered.

SUMMARY OF THE INVENTION

It is an object of the present invention to solve the above-described conventional problem, by improving the precision in detecting the rotational speed by reducing noise superimposed on the FG signal, while securing a high driving efficiency in a motor in which extended portions are provided at outer circumferential ends of magnetic poles of a stator.

The present invention is directed to a motor, including: a stator that is mounted on a substrate and on whose outer circumference a plurality of magnetic poles are arranged at a first predetermined interval; and a rotor that is rotatably disposed around the stator. The inner circumferential face of the rotor is provided with a magnet magnetized to have opposite polarities at a second predetermined interval in a direction opposing the stator, and magnetized to have opposite polarities at a third predetermined interval in a direction opposing the substrate. Each of the outer circumferential ends of the plurality of magnetic poles of the stator is provided with a first extended portion that extends from a magnetic pole base to the substrate side, and a second extended portion that extends from the magnetic pole base to a side opposite the substrate side. A face of the substrate opposing the rotor is provided with a FG pattern including a main pattern and a cancellation pattern outside the outer circumferential face of the stator such that the FG pattern opposes the magnet.

The present invention is directed to an electronic apparatus, including: a main body case; a driven member that is provided in the main body case; and a motor that is coupled to the driven member; wherein the motor is the motor according to the present invention.

DESCRIPTION OF THE PREFERRED EMBODIMENTS

Figure 1:
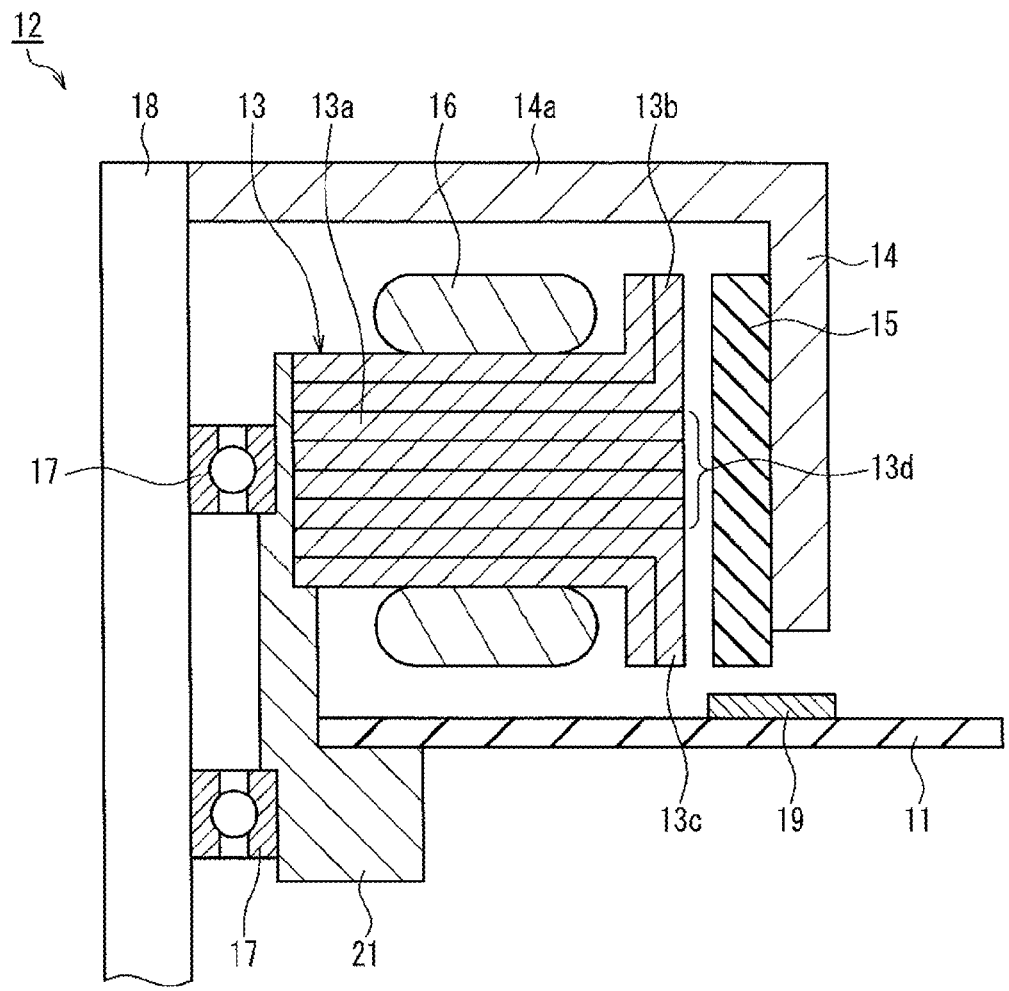
FIG. 1 is a cross-sectional view showing the schematic configuration of a motor according to Embodiment 1 of the present invention.

In the motor of the present invention, outer circumferential ends of the magnetic poles of the stator have the first and the second extended portions, and, thus, a magnetism collecting effect can be improved, and a high driving efficiency can be realized.

Furthermore, a face of the substrate opposing the rotor is provided with a FG pattern outside the outer circumferential face of the stator such that the FG pattern opposes the magnet, and, thus, leakage magnetic fluxes formed by magnetic fluxes obtained by the main magnetization leaking out of the first extended portion hardly are linked to the FG pattern. Accordingly, noise superimposed on the FG signal is reduced, and the precision in detecting the rotational speed using the FG pattern can be improved.

The electronic apparatus of the present invention drives a driven member using the above-described motor of the present invention and thus can drive the driven member efficiently and precisely.

In the motor of the present invention, it is preferable that a distance from a tip end of the first extended portion to the magnet is larger than a distance from a tip end of the second extended portion to the magnet. Accordingly, the distance between the tip end of the first extended portion and the FG pattern is increased further. Accordingly the phenomenon that leakage magnetic fluxes formed by magnetic fluxes obtained by the main magnetization leaking out of the first extended portion are linked to the FG pattern can be reduced further. Accordingly, the precision in detecting the rotational speed using the FG pattern can be improved further.

In the description above, the first extended portion may be inclined such that a distance to the magnet increases as the tip end of the first extended portion is approached. Alternatively, the number of layers of plate-shaped members constituting the first extended portion may be smaller than the number of layers of plate-shaped members constituting the second extended portion. Alternatively, the first extended portion may be configured from a plurality of plate-shaped members, and the plurality of plate-shaped members may have a height from the magnetic pole base that increases as the distance from the magnet increases. Accordingly, the distance from the tip end of the first extended portion to the magnet can be increased with a simple configuration, and, thus, the tip end of the first extended portion can be positioned away from the FG pattern.

In the motor of the present invention, a height of the first extended portion from the magnetic pole base may be lower than a height of the second extended portion from the magnetic pole base. Also in this case, the tip end of the first extended portion can be positioned away from the FG pattern with a simple configuration.

In the description above, it is preferable that an end portion of the magnet on the substrate side is projected further toward the substrate side than is a tip end of the first extended portion. Accordingly, displacement of the magnetic center caused because the first extended portion and the second extended portion are asymmetrical can be corrected. Thus, deterioration of precision in rotation or generation of noise and vibration can be suppressed.

Hereinafter, the present invention will be described using preferred embodiments. Here, it will be appreciated that the present invention is not limited to the following embodiments.

Embodiment 1

Figure 2:
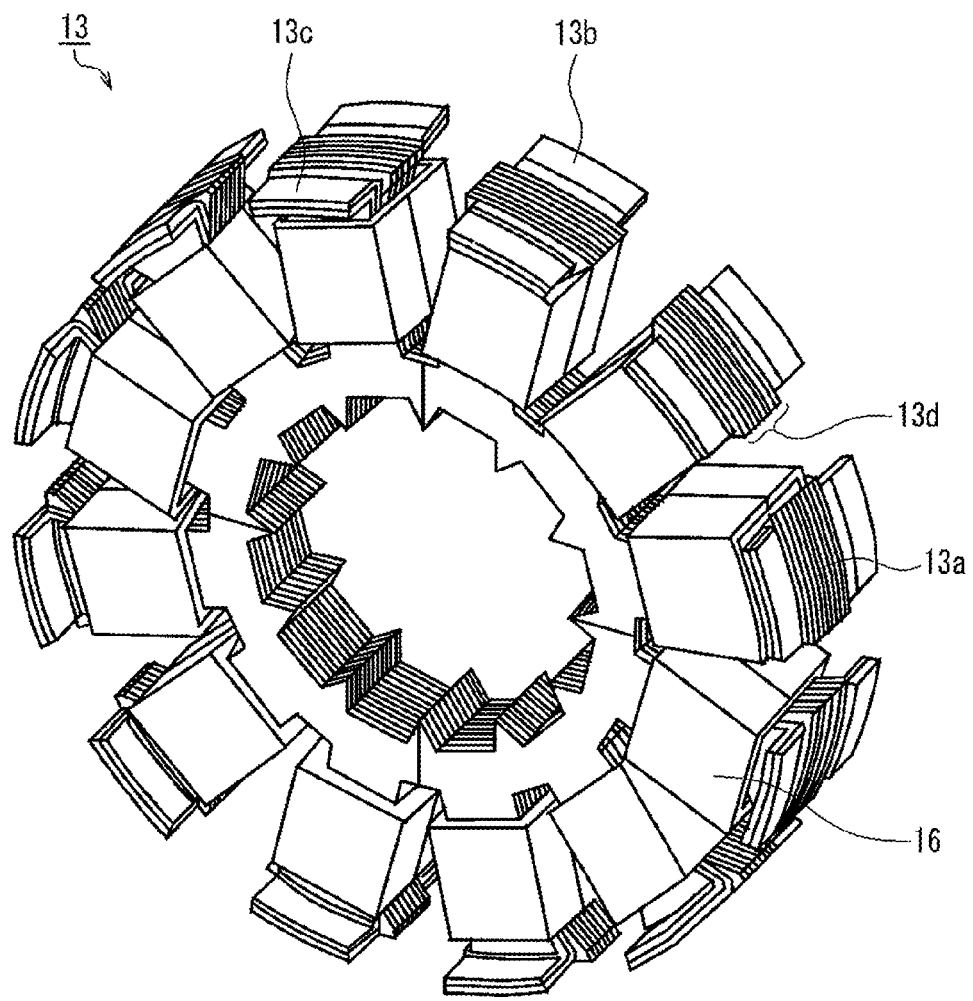
FIG. 2 is a perspective view of a stator constituting the motor according to Embodiment 1 of the present invention.
Figure 3:
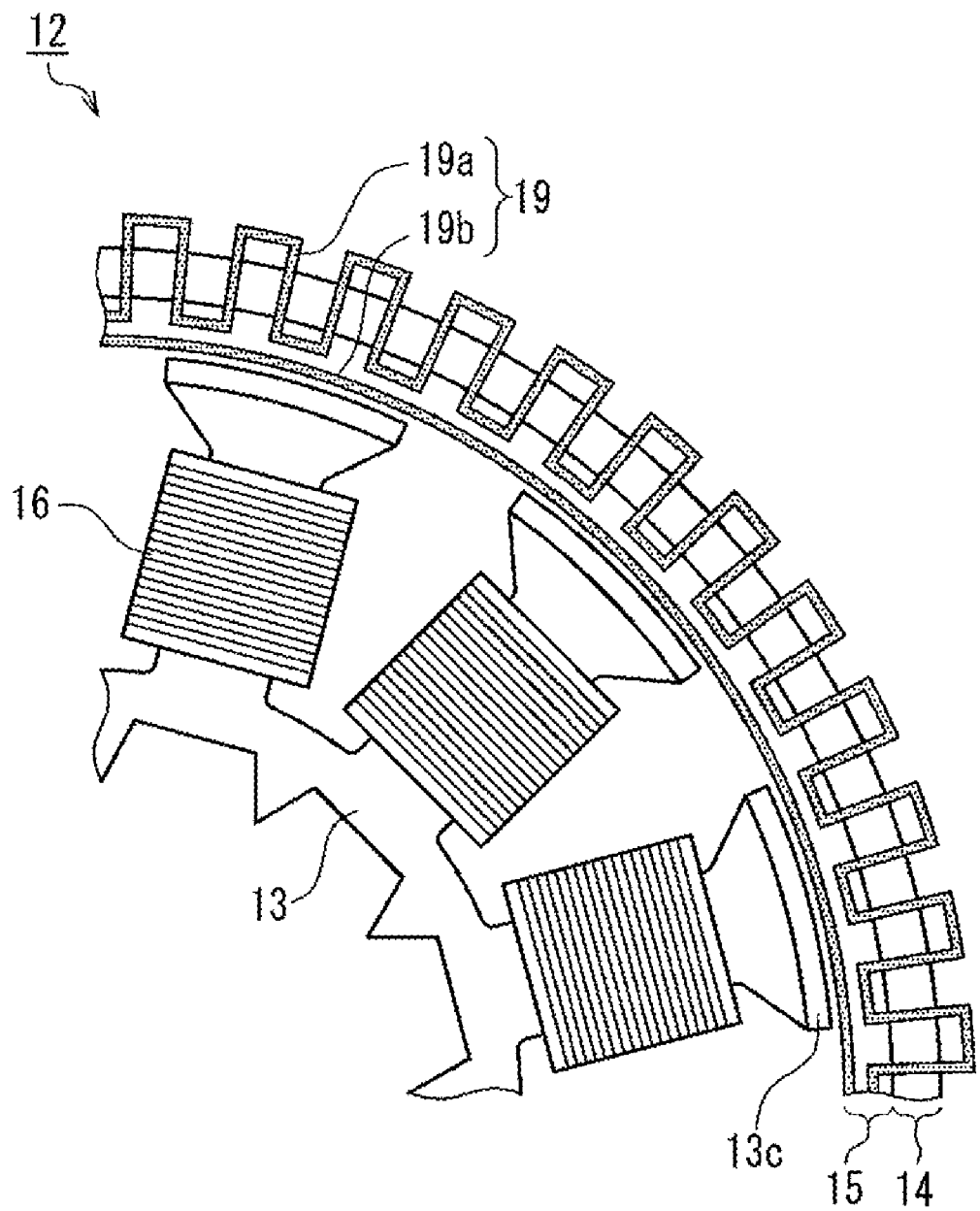
FIG. 3 is a plan view of a FG pattern provided in the motor according to Embodiment 1 of the present invention.

FIG. 1 is a cross-sectional view showing the schematic configuration of a motor 12 according to Embodiment 1 of the present invention. The cross-sectional view of the motor is substantially symmetrical with respect to a driving shaft 18, and, thus, FIG. 1 shows only a half portion with respect to the driving shaft 18. FIG. 2 is a perspective view of a stator 13 constituting the motor 12 according to Embodiment 1. FIG. 3 is a plan view of a FG pattern 19 provided in the motor 12 according to Embodiment 1. FIG. 3 shows only a first quadrant of the FG pattern 19.

In the description below, the direction of the driving shaft 18 of the motor 12 is taken as a vertical direction, and the upper side and the lower side in the section of the diagram of FIG. 1 are referred to respectively as an "upper side" and a "lower side" of the motor 12.

As shown in FIG. 1, the motor 12 of Embodiment 1 includes the stator 13 that is mounted on a wiring board (substrate) 11 via an attachment portion 21, and a rotor 14 that is disposed around the stator 13. The rotor 14 is in the shape of a cylinder. The upper end thereof has a top plate 14a fixed thereto, and the lower end thereof is open. The inner circumferential face of the attachment portion 21 is provided with bearings 17. The driving shaft 18 of the motor 12 passes through the bearings 17, and the upper end of the driving shaft 18 is fixed to the top plate 14a of the rotor 14. As a result, the rotor 14 and the driving shaft 18 are freely rotatable with respect to the stator 13 via the bearings 17. A magnet 15 in the shape of a ring is fixed to the inner circumferential face of the rotor 14. A face of the magnet 15 opposing the stator 13 is magnetized (main magnetization) such that an N-pole and an S-pole are formed alternately (such that adjacent poles have opposite polarities) at a predetermined interval in a direction opposing the stator 13 (radial direction). Furthermore, in addition to the main magnetization, multi-pole magnetization (FG magnetization) such that an N-pole and an S-pole are alternately formed at a predetermined interval in a direction opposing the wiring board 11 (vertical direction) is performed on a face of the magnet 15 opposing the wiring board 11.

The stator 13 may be a layered member in which a plurality of plate-shaped members having the same thickness (e.g., thin steel plates having a high magnetic permeability) are layered. As shown in FIG. 2, a plurality of magnetic poles 13a are arranged at a predetermined interval in the circumferential direction on the outer circumference of the stator 13. A coil 16 for an electromagnet is wound about a portion where a magnetic circuit is formed on the inner side of each magnetic pole 13a. When an AC power is applied to the coil 16, each magnetic pole 13a is magnetized to have an N-polarity and an S-polarity alternately. Accordingly, attraction or repulsion is generated between the magnetic pole 13a and the magnet 15 opposing each other, the rotor 14 rotates about the driving shaft 18, and a rotational driving force is output via the driving shaft 18.

The wiring board 11 is provided with the FG pattern 19. As shown in FIG. 3, in order to reduce the influence of the main magnetization, the FG pattern 19 is configured from a zigzag main pattern 19a and a circular cancellation pattern 19b, and the main pattern 19a and the cancellation pattern 19b are connected in series. Here, the configuration of the main pattern 19a and the cancellation pattern 19b is not limited to that in FIG. 3, and configurations other than the above can be applied. Furthermore, the main pattern 19a may be provided inside the cancellation pattern 19b (on the driving shaft 18 side).

As the amount of magnetic fluxes obtained by the FG magnetization of the magnet 15 linked to the FG pattern 19 increases, the S/N ratio of a FG signal output from the FG pattern 19 is improved. Accordingly, in the present invention, as shown in FIG. 1, the FG pattern 19 is disposed so as to oppose the magnet 15, on the upper face (face opposing the rotor 14) of the wiring board 11. Furthermore, in order to arrange the magnet 15 and the FG pattern 19 as close to each other as possible, the lower end of the magnet 15 (the end portion on the wiring board 11 side) is extended to be near the wiring board 11.

As a result, the vertical size of the magnet 15 increases. In accordance with this increase, the outer circumferential end of each magnetic pole 13a of the stator 13 is provided with a first extended portion 13c that extends from a central magnetic pole base 13d to the wiring board 11 side, and a second extended portion 13b that extends from the magnetic pole base 13d to the side opposite the wiring board 11 side (on the top plate 14a side). The first extended portion 13c and the second extended portion 13b are substantially parallel to the magnet 15, that is, parallel to the axial direction of the driving shaft 18. More specifically, the first extended portion 13c is formed by bending outer circumferential portions of two lower layers, including the lowermost layer, of a plurality of layers of plate-shaped members constituting the stator 13 downward at a substantially right angle, and the second extended portion 13b is formed by bending outer circumferential portions of two upper layers, including the uppermost layer, of the plurality of layers of plate-shaped members constituting the stator 13 upward at a substantially right angle. Here, the number of layers of plate-shaped members constituting the first and the second extended portions 13c and 13b is not limited to two, and may be one, or three or more.

In the case where the first extended portion 13c and the second extended portion 13b are arranged vertically on the magnetic pole base 13d from the outer circumferential end of the magnetic pole 13a in this manner, the area in which the magnetic pole 13a and the vertically extended magnet 15 oppose each other increases as shown in FIG. 1. The first extended portion 13c and the second extended portion 13b have a magnetism collecting effect, and, thus, magnetic fluxes obtained by the main magnetization drawn into the stator 13 increase, and the driving force and the driving efficiency of the motor 12 are improved. The first extended portion 13c and the second extended portion 13b ordinarily are referred to as end plates.

In Embodiment 1, as shown in FIGS. 1 and 3, the FG pattern 19 is disposed on an outer side in the radial direction of the outer circumferential face of the stator 13. The effect obtained by this configuration will be described below.

Figure 4:
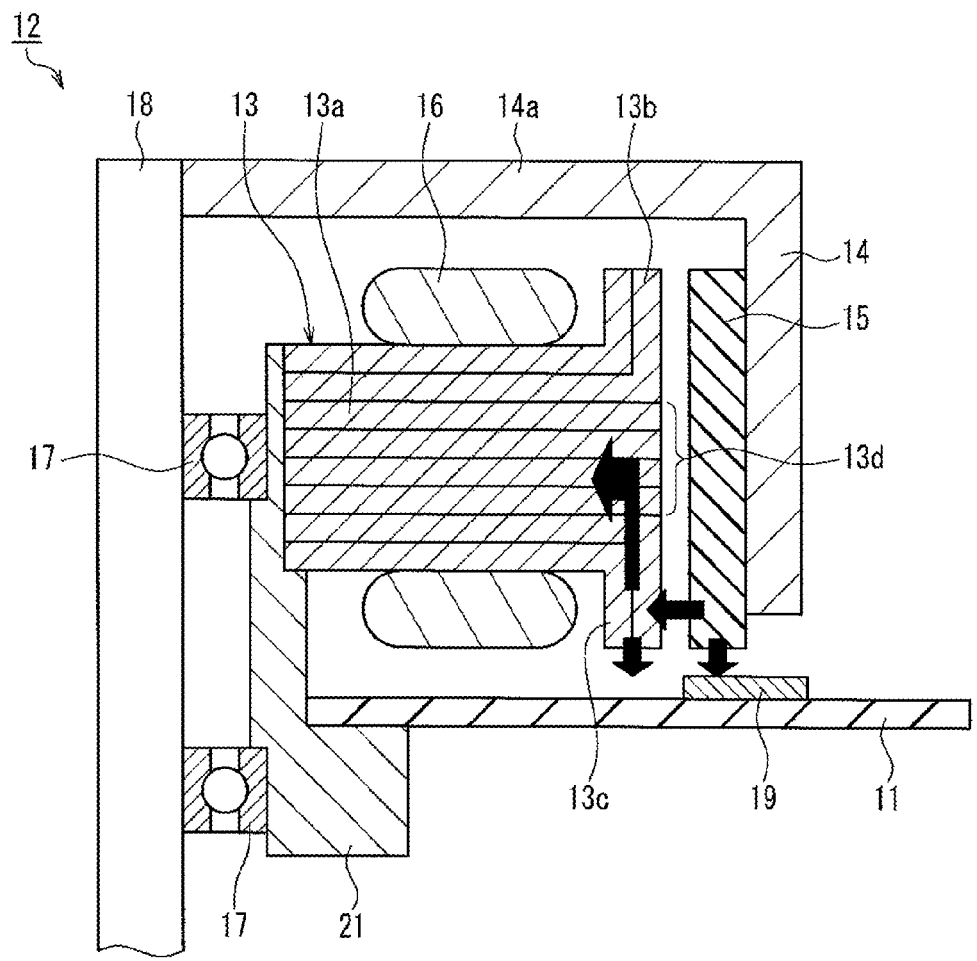
FIG. 4 is a cross-sectional view showing simplified flows of magnetic fluxes near the FG pattern in the motor according to Embodiment 1 of the present invention.
Figure 5:
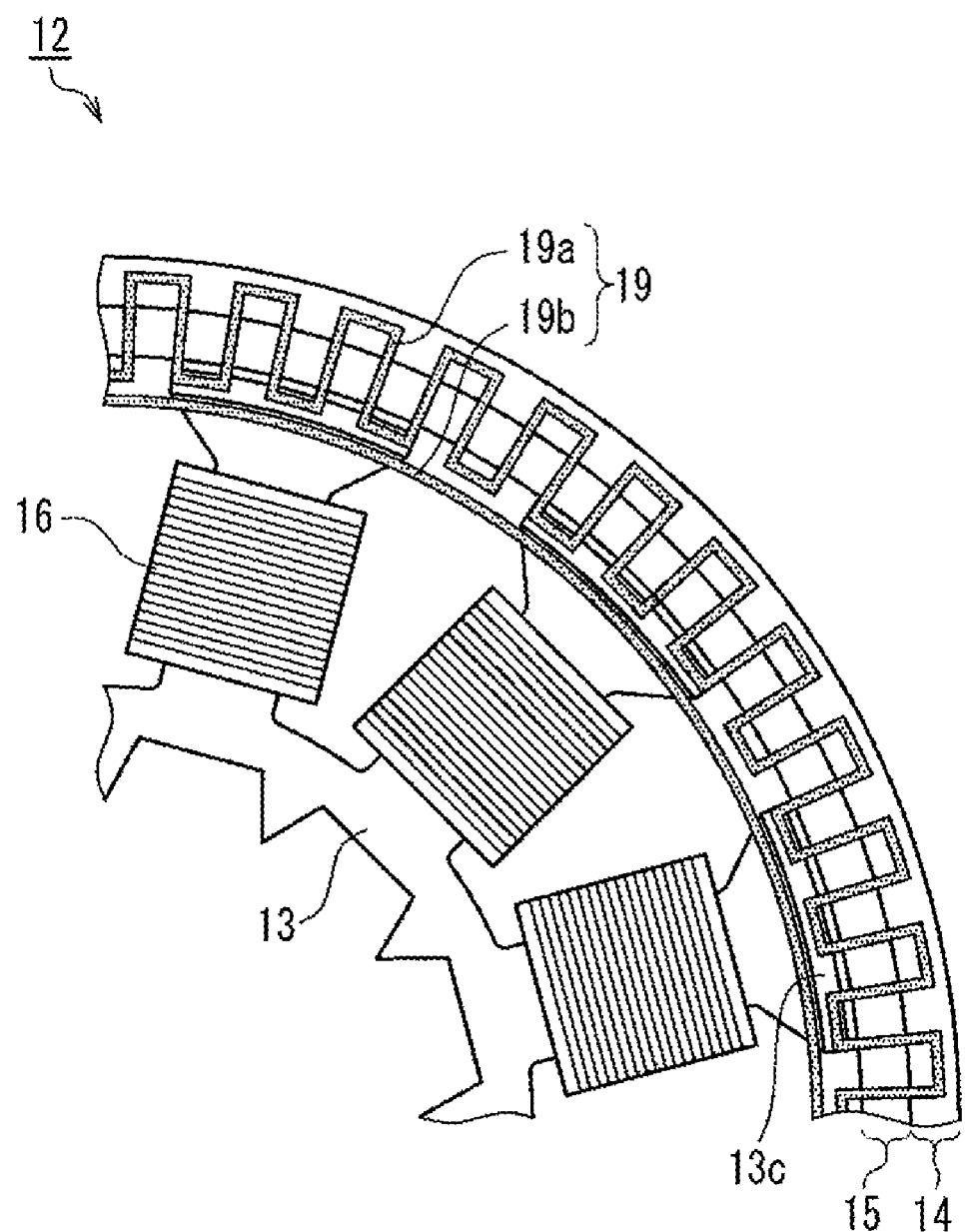
FIG. 5 is a plan view of a FG pattern provided in a conventional motor.
Figure 6:
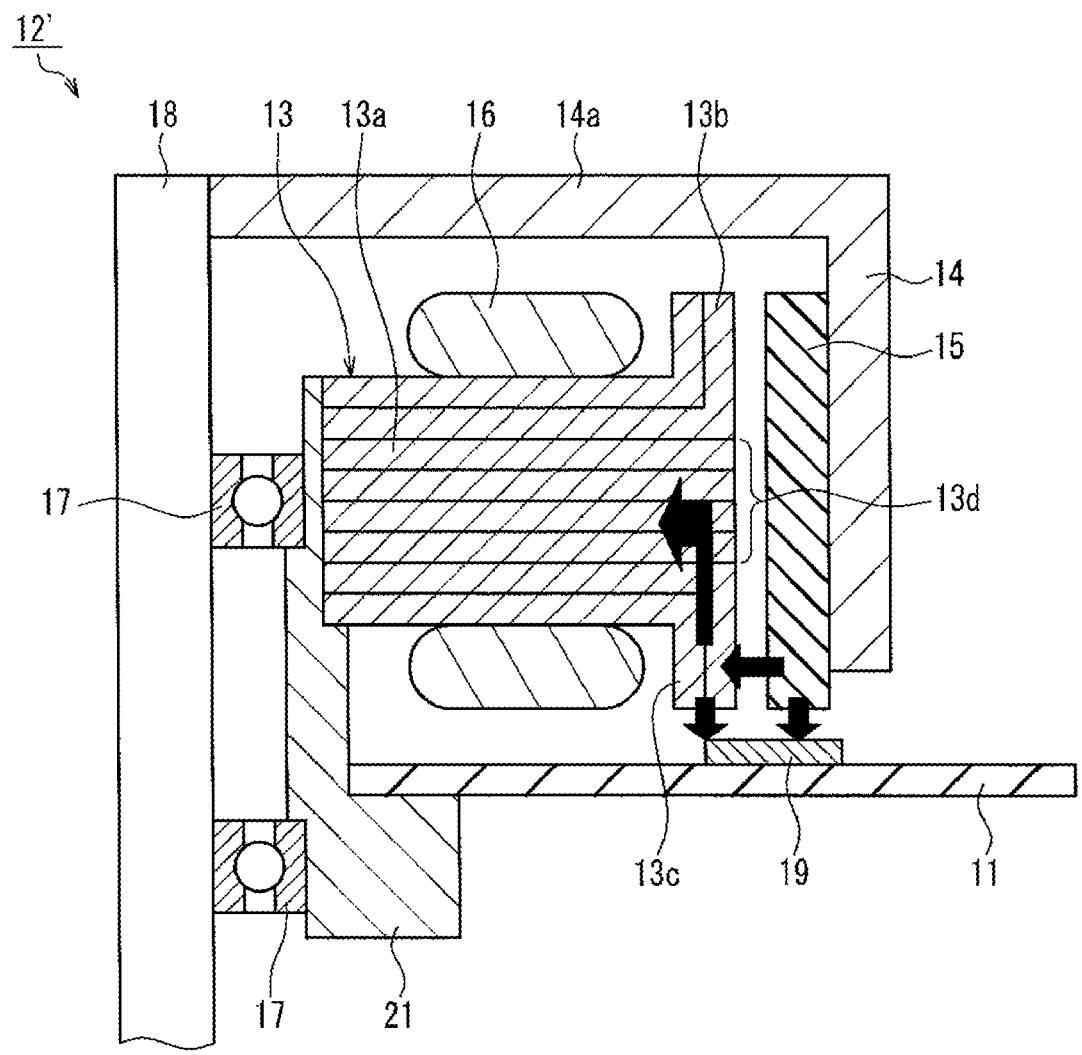
FIG. 6 is a cross-sectional view showing simplified flows of magnetic fluxes near the FG pattern in the conventional motor.

FIG. 4 is a cross-sectional view showing, as arrows, simplified flows of magnetic fluxes near the FG pattern 19 in the motor 12 according to Embodiment 1. For the sake of comparison, FIG. 5 shows a plan view of the FG pattern 19 provided in the conventional motor 12' as in FIG. 3. FIG. 6 is a cross-sectional view showing, as arrows, simplified flows of magnetic fluxes near the FG pattern 19 in the conventional motor 12' shown in FIG. 5. The conventional motor 12' shown in FIGS. 5 and 6 is different from the motor 12 of Embodiment 1 in that the FG pattern 19 and the first extended portion 13c are arranged so as to be overlapped in the radial direction.

In both of the motor 12 of Embodiment 1 and the conventional motor 12', magnetic fluxes obtained by the main magnetization are collected to the extended portions 13b and 13c through their magnetism collecting effect. Most of the collected magnetic fluxes pass through the extended portions 13b and 13c, and extend into the magnetic pole 13a. However, due to magnetic saturation of the extended portions 13b and 13c, part of the magnetic fluxes leaks out of the extended portions 13b and 13c, and forms leakage magnetic fluxes. The leakage magnetic fluxes can be reduced by increasing the thickness of the extended portions 13b and 13c, but cannot be completely reduced to zero. Furthermore, since the extended portions 13b and 13c are arranged at a predetermined interval in the circumferential direction, a magnetism collecting effect on magnetic fluxes obtained by the main magnetization differs between a portion where the extended portions 13b and 13c are present and a portion where these extended portions are not present, and, thus, leakage magnetic fluxes from the extended portions 13b and 13c become non-uniform.

In the conventional motor 12', as shown in FIGS. 5 and 6, part (an inner portion) of the FG pattern 19 is positioned below the first extended portion 13c. Accordingly the degree of influence of leakage magnetic fluxes on a portion of the FG pattern 19 close to the first extended portion 13c (e.g., the cancellation pattern 19b) is significantly different from the degree of influence of leakage magnetic fluxes on a portion away from the first extended portion 13c (e.g., the outer portion of the main pattern 19a). Accordingly, the influence of magnetic fluxes obtained by the main magnetization cannot be sufficiently canceled by the main pattern 19a and the cancellation pattern 19b, and noise is superimposed on the FG signal.

On the other hand, in the motor 12 of Embodiment 1, the FG pattern 19 is disposed on an outer side in the radial direction of the outer circumferential face of the stator 13. Accordingly, as shown in FIG. 4, the FG pattern 19 is away from the first extended portion 13c. Accordingly, the leakage magnetic fluxes from the first extended portion 13c are hardly linked to the FG pattern 19. That is to say, the leakage magnetic fluxes hardly affect either a portion of the FG pattern 19 close to the first extended portion 13c (e.g., the cancellation pattern 19b) or a portion away from the first extended portion 13c (e.g., the outer portion of the main pattern 19a). Accordingly, even when the FG pattern 19 receives the influence of magnetic fluxes obtained by the main magnetization, this influence can be canceled sufficiently by the main pattern 19a and the cancellation pattern 19b. Thus, noise superimposed on the FG signal is reduced, and the precision in detecting the rotational speed using the FG pattern 19 can be improved.

Figure 7:
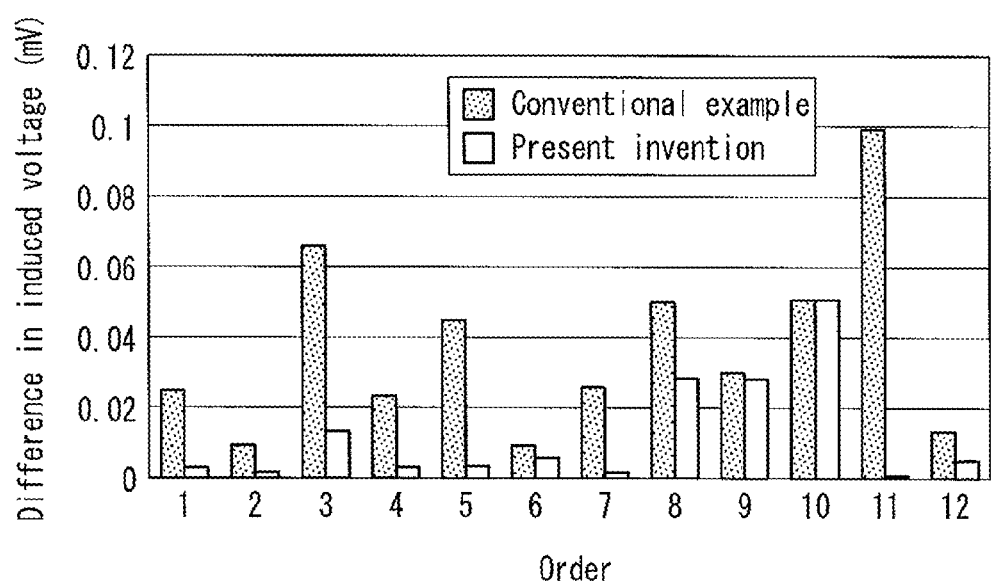
FIG. 7 is a graph showing the influence of magnetic fluxes obtained by the main magnetization on a main pattern and a cancellation pattern constituting the FG pattern in the motor according to Embodiment 1 of the present invention and the conventional motor, which is obtained using a magnetic field analysis.

In the motor 12 of Embodiment 1 and the conventional motor 12', the influence of magnetic fluxes obtained by the main magnetization on the main pattern 19a and the cancellation pattern 19b was confirmed using a magnetic field analysis. More specifically, a frequency analysis was performed on a difference between induced voltages generated at the main pattern 19a and the cancellation pattern 19b constituting the FG pattern 19 due to magnetic fluxes obtained by the main magnetization when the rotor 14 rotated. FIG. 7 shows the results. In FIG. 7, the vertical axis indicates a difference between induced voltages generated at the main pattern 19a and the cancellation pattern 19b. The horizontal axis indicates an order obtained when a rotational frequency component for two poles of the magnet 15 is taken as a primary component. According to FIG. 7, at all orders, the motor 12 of Embodiment 1 ("present invention") has a difference in the induced voltage smaller than that of the conventional motor 12' ("conventional example"). Accordingly, in the motor 12 of Embodiment 1, the influence of magnetic fluxes obtained by the main magnetization is canceled between the main pattern 19a and the cancellation pattern 19b, and, thus, noise superimposed on the FG signal can be reduced. It was confirmed that, as a result, the rotational speed can be detected with a high precision.

Embodiment 2

Figure 8:
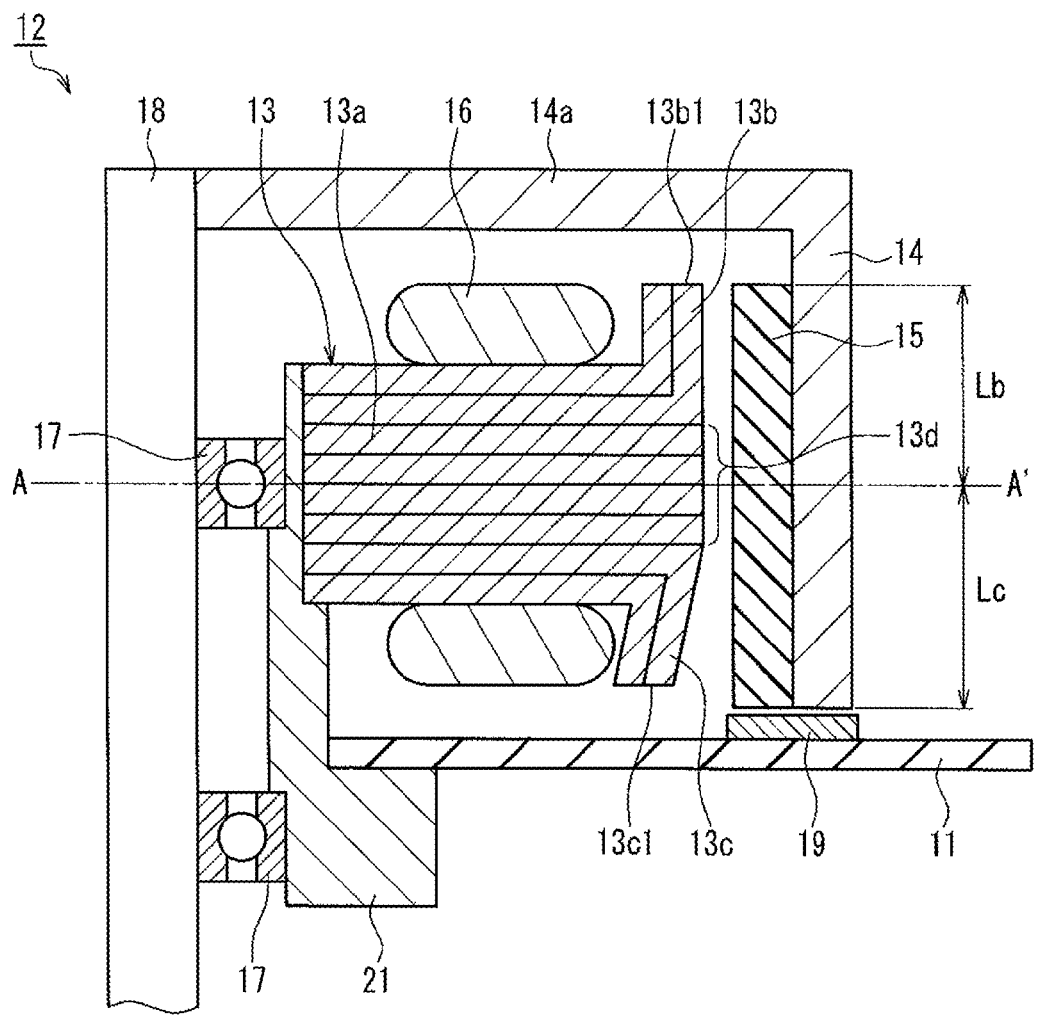
FIG. 8 is a cross-sectional view showing the schematic configuration of a motor according to Embodiment 2 of the present invention.

FIG. 8 is a cross-sectional view showing the schematic configuration of a motor according to Embodiment 2 of the present invention. As in FIG. 1, FIG. 8 shows only a half portion with respect to the driving shaft 18. In FIG. 8, the same portions as those in FIG. 1 are denoted by the same reference numerals.

In Embodiment 2, the cross-sectional shapes of the first extended portion 13c and the second extended portion 13b are asymmetrical with respect to the magnetic pole base 13d. In this aspect, Embodiment 2 is different from Embodiment 1 in which the cross-sectional shapes are symmetrical. More specifically, as shown in FIG. 8, the distance (in the radial direction) from a tip end 13c1 (i.e., a portion that is the closest to the wiring board 11) of the first extended portion 13c to the magnet 15 is larger than the distance (in the radial direction) from a tip end 13b1 (i.e., a portion that is the closest to the top plate 14a) of the second extended portion 13b to the magnet 15. In order to realize this configuration, the first extended portion 13c is formed by bending two lower layers of a plurality of layers of plate-shaped members constituting the stator 13 at an angle larger than a right angle. The second extended portion 13b is formed by bending two upper layers of the plurality of layers of plate-shaped members constituting the stator 13 at a substantially right angle as in Embodiment 1.

As in Embodiment 2, in the case where the tip end 13c1 of the first extended portion 13c on the wiring board 11 side is positioned away from the magnet 15, the distance between the tip end 13c1 of the first extended portion 13c and the FG pattern 19 increases. Accordingly the phenomenon of leakage magnetic fluxes formed by magnetic fluxes obtained by the main magnetization leaking out of the tip end 13c1 of the first extended portion 13c being linked to the FG pattern 19 can be reduced further than in Embodiment 1. Accordingly, the influence of magnetic fluxes obtained by the main magnetization can be sufficiently canceled by the main pattern 19a and the cancellation pattern 19b. Thus, noise superimposed on the FG signal is reduced, and the precision in detecting the rotational speed using the FG pattern 19 can be improved.

Here, as in Embodiment 2, in the case where the distance to the magnet 15 is made different between the first extended portion 13c and the second extended portion 13b, the magnetic center is displaced from the central position in the vertical direction of the stator 13. Accordingly, attractions to or repulsions from the magnet 15 are asymmetrical between the upper portion and the lower portion of the stator 13, and deterioration of precision in rotation, generation of noise and vibration, or the like may occur.

Accordingly, in Embodiment 2, the lower end of the magnet 15 (the end portion on the wiring board 11 side) is projected further toward the wiring board 11 side than the tip end 13c1 of the first extended portion 13c is. Here, the upper end of the magnet 15 (the end portion on the top plate 14a side) and the tip end 13b1 of the second extended portion 13b are at substantially the same position in the vertical direction. Accordingly, as shown in FIG. 8, a distance Lc from the central line A-A' of the stator 13 in the vertical direction to the lower end of the magnet 15 is longer than the distance Lb from the central line A-A' to the upper end of the magnet 15.

In the case where the magnet 15 overhangs further toward the wiring board 11 side than the first extended portion 13c is in this manner, displacement of the magnetic center caused because the amount of magnetic fluxes differs between the first extended portion 13c and the second extended portion 13b can be corrected. Accordingly deterioration of precision in rotation or generation of noise and vibration, caused because the first extended portion 13c and the second extended portion 13b are asymmetrical, can be suppressed. Here, the correction of displacement of the magnetic center can be performed, for example, by comparing differences in the amounts of magnetic fluxes at an average gap in a portion having the distance Lb above the central line A-A and at an average gap in a portion having the distance Lc below the central line A-A, using a permeance calculation.

Embodiment 2 is the same as Embodiment 1 except for the above-described aspects.

Embodiment 3

Figure 9:
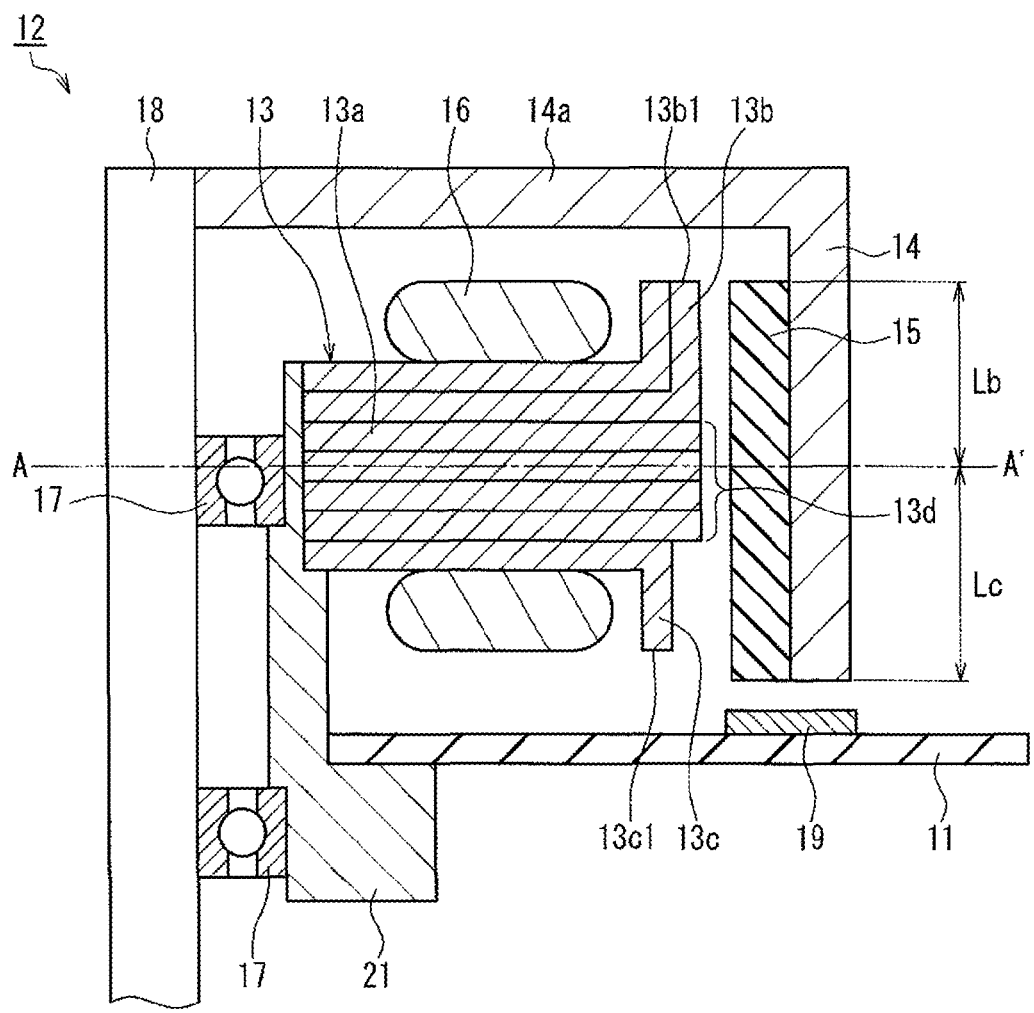
FIG. 9 is a cross-sectional view showing the schematic configuration of a motor according to Embodiment 3 of the present invention.

FIG. 9 is a cross-sectional view showing the schematic configuration of a motor according to Embodiment 3 of the present invention. As in FIG. 1, FIG. 9 shows only a half portion with respect to the driving shaft 18. In FIG. 9, the same portions as those in FIG. 1 are denoted by the same reference numerals.

In Embodiment 3, as in Embodiment 2, the distance (in the radial direction) from the tip end 13c1 of the first extended portion 13c to the magnet 15 is larger than the distance (in the radial direction) from the tip end 13b1 of the second extended portion 13b to the magnet 15. Here, a specific configuration for varying the distance to the magnet 15 is different from that in Embodiment 2. In Embodiment 3, as shown in FIG. 9, the number of layers of plate-shaped members constituting the first extended portion 13c on the wiring board 11 side is smaller than the number of layers of plate-shaped members constituting the second extended portion 13b on the top plate 14a side of the rotor 14.

More specifically, the first extended portion 13c is formed by bending one layer of plate-shaped member that is the lowermost layer of a plurality of layers of plate-shaped members constituting the stator 13 downward so as to be substantially parallel to the magnet 15, and the second extended portion 13b is formed by bending two upper layers of plate-shaped members, including the uppermost layer, of the plurality of layers of plate-shaped members constituting the stator 13 upward so as to be substantially parallel to the magnet 15. The position at which the lowermost plate-shaped member is bent and the position at which the uppermost plate-shaped member is bent substantially match in the radial direction. Here, the numbers of layers of plate-shaped members constituting the first extended portion 13c and the second extended portion 13b are not limited to those described above. For example, the first extended portion 13c may be configured from two layers of plate-shaped members, and the second extended portion 13b may be configured from three layers of plate-shaped members.

As described above, in the case where the number of layers of plate-shaped members constituting the first extended portion 13c is made smaller than the number of layers of plate-shaped members constituting the second extended portion 13b, the distance from the tip end 13c1 of the first extended portion 13c to the magnet 15 is made larger than the distance from the tip end 13b1 of the second extended portion 13b to the magnet 15 as in Embodiment 2. Accordingly, as in Embodiment 2, the distance from the tip end 13c1 of the first extended portion 13c to the FG pattern 19 increases. Accordingly, noise superimposed on the FG signal is reduced, and the precision in detecting the rotational speed using the FG pattern 19 can be improved.

Also in Embodiment 3, it is preferable as in Embodiment 2 that the lower end of the magnet 15 is projected further toward the wiring board 11 side than the tip end 13c1 of the first extended portion 13c is such that the distance Lc from the central line A-A of the stator 13 in the vertical direction to the lower end of the magnet 15 is longer than the distance Lb from the central line A-A to the upper end of the magnet 15. Accordingly, deterioration of precision in rotation or generation of noise and vibration can be suppressed.

Embodiment 3 is the same as Embodiment 1 except for the above-described aspects.

Embodiment 4

Figure 10:
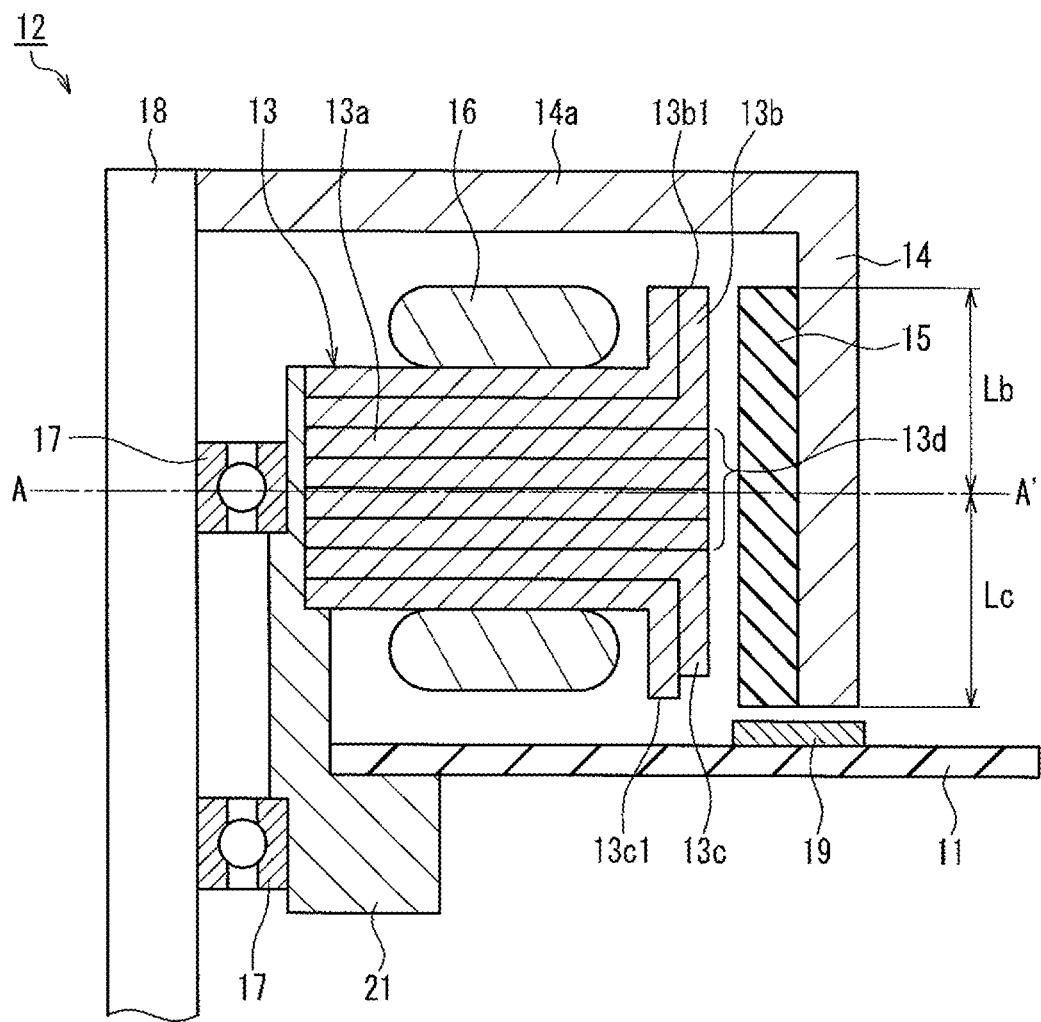
FIG. 10 is a cross-sectional view showing the schematic configuration of a motor according to Embodiment 4 of the present invention.

FIG. 10 is a cross-sectional view showing the schematic configuration of a motor according to Embodiment 4 of the present invention. As in FIG. 1, FIG. 10 shows only a half portion with respect to the driving shaft 18. In FIG. 10, the same portions as those in FIG. 1 are denoted by the same reference numerals.

In Embodiment 4, as in Embodiments 2 and 3, the distance (in the radial direction) from the tip end 13c1 of the first extended portion 13c to the magnet 15 is larger than the distance (in the radial direction) from the tip end 13b1 of the second extended portion 13b to the magnet 15. Here, a specific configuration for varying the distance to the magnet 15 is different from those in Embodiments 2 and 3. In Embodiment 4, as shown in FIG. 10, a plurality of plate-shaped members constituting the first extended portion 13c on the wiring board 11 side have a height (vertical distance) from the magnetic pole base 13d that increases as the distance from the magnet 15 increases.

More specifically, the first extended portion 13c is formed by bending two lower layers of plate-shaped members, including the lowermost layer, of a plurality of layers of plate-shaped members constituting the stator 13 downward so as to be substantially parallel to the magnet 15. Here, the distance from the magnetic pole base 13d to the lower end of a plate-shaped member away from the magnet 15 (the lowermost plate-shaped member), of two bent layers of plate-shaped members, is longer than that to the lower end of a plate-shaped member close to the magnet. This sort of configuration can be realized, for example, simply by setting two layers of plate-shaped members constituting the first extended portion 13c to the same size, and bending the outer circumferential portions thereof toward the wiring board 11. Accordingly, two layers of plate-shaped members constituting the first extended portion 13c can be formed in the same shape using the same mold, and, thus, the production efficiency is improved.

As in Embodiments 1 to 3, a plurality of plate-shaped members constituting the second extended portion 13b on the top plate 14a side have the same height (vertical distance) from the magnetic pole base 13d.

Here, the numbers of layers of plate-shaped members constituting the first extended portion 13c and the second extended portion 13b are not limited to those described above. It is sufficient that the first extended portion 13c is configured from a plurality of plate-shaped members, and that a plurality of plate-shaped members constituting the first extended portion 13c have a height from the magnetic pole base 13d that increases as the distance from the magnet 15 increases.

Also in Embodiment 4, as in Embodiments 2 and 3, the distance from the tip end 13c1 of the first extended portion 13c to the magnet 15 is made larger than the distance from the tip end 13b1 of the second extended portion 13b to the magnet 15. Accordingly as in Embodiments 2 and 3, the distance from the tip end 13c1 of the first extended portion 13c to the FG pattern 19 increases. Accordingly, noise superimposed on the FG signal is reduced, and the precision in detecting the rotational speed using the FG pattern 19 can be improved.

Also in Embodiment 4, it is preferable as in Embodiments 2 and 3 that the lower end of the magnet 15 is projected further toward the wiring board 11 side than the tip end 13c1 of the first extended portion 13c is such that the distance Lc from the central line A-A of the stator 13 in the vertical direction to the lower end of the magnet 15 is longer than the distance Lb from the central line A-A' to the upper end of the magnet 15. Accordingly, deterioration of precision in rotation or generation of noise and vibration can be suppressed.

Embodiment 4 is the same as Embodiment 1 except for the above-described aspects.

Embodiment 5

Figure 11:
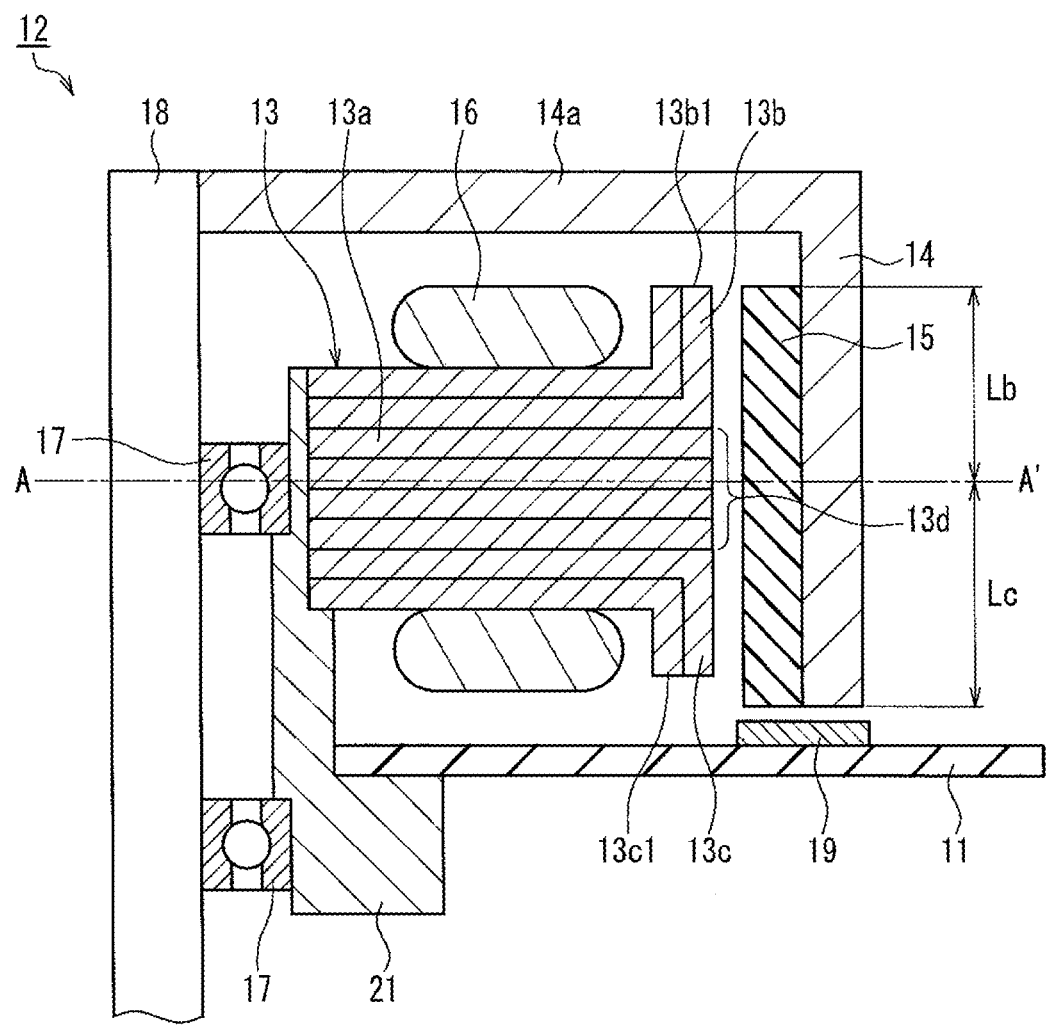
FIG. 11 is a cross-sectional view showing the schematic configuration of a motor according to Embodiment 5 of the present invention.

FIG. 11 is a cross-sectional view showing the schematic configuration of a motor according to Embodiment 5 of the present invention. As in FIG. 1, FIG. 11 shows only a half portion with respect to the driving shaft 18. In FIG. 11, the same portions as those in FIG. 1 are denoted by the same reference numerals.

In Embodiment 5, as in Embodiments 2 to 4, the cross-sectional shapes of the first extended portion 13c and the second extended portion 13b are asymmetrical with respect to the magnetic pole base 13d. Here, a specific configuration for asymmetrizing the cross-sectional shapes is different from those in Embodiments 2 to 4. In Embodiment 5, as shown in FIG. 11, the height (vertical distance) of the first extended portion 13c from the magnetic pole base 13d is lower than the height (vertical distance) of the second extended portion 13b from the magnetic pole base 13d. Also in the case where the distance between the tip end 13c1 of the first extended portion 13c and the FG pattern 19 is increased in the vertical direction as in Embodiment 5, as in Embodiments 2 to 4, the phenomenon that leakage magnetic fluxes formed by magnetic fluxes obtained by the main magnetization leaking out of the tip end 13c1 of the first extended portion 13c are linked to the FG pattern 19 can be reduced further than in Embodiment 1. Accordingly, the influence of magnetic fluxes obtained by the main magnetization can be canceled sufficiently by the main pattern 19a and the cancellation pattern 19b. Thus, noise superimposed on the FG signal is reduced, and the precision in detecting the rotational speed using the FG pattern 19 can be improved.

Also in Embodiment 5, it is preferable as in Embodiments 2 to 4 that the lower end of the magnet 15 is projected further toward the wiring board 11 side than the tip end 13c1 of the first extended portion 13c is such that the distance Lc from the central line A-A of the stator 13 in the vertical direction to the lower end of the magnet 15 is longer than the distance Lb from the central line A-A' to the upper end of the magnet 15.

Accordingly, deterioration of precision in rotation or generation of noise and vibration can be suppressed.

Embodiment 5 is the same as Embodiment 1 except for the above-described aspects.

Two or more of Embodiments 2 to 5 described above may be combined as appropriate.

Embodiment 6

Figure 12:
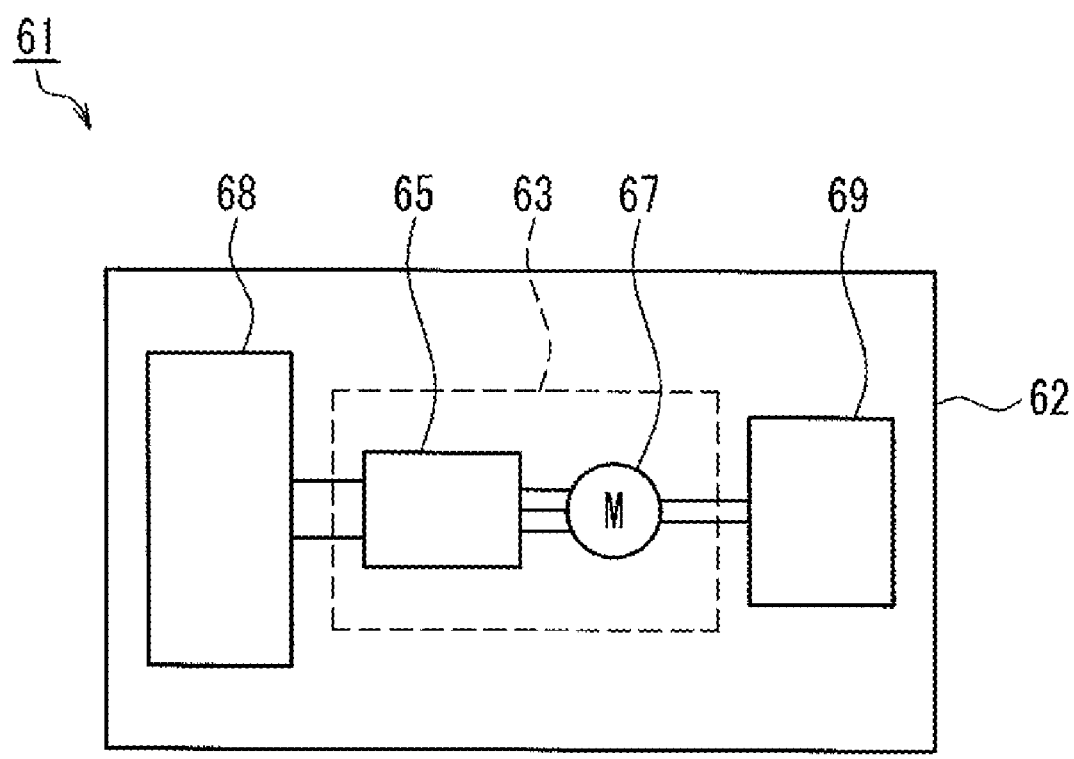
FIG. 12 is a diagram showing the schematic configuration of an example of an electronic apparatus using the motor of the present invention.

FIG. 12 is a diagram showing the schematic configuration of an example of an electronic apparatus using the motor of the present invention. In FIG. 12, an electronic apparatus 61 includes a casing 62 that functions as a main body case, an electric motor 67 mounted inside the casing 62, a driving unit 65 for driving the electric motor 67, a power source 68 for supplying electricity to the driving unit 65, and a load (driven member) 69 such as a mechanism portion that is driven using the electric motor 67 as a power source. Here, the electric motor 67 and the driving unit 65 constitute an electric motor drive apparatus 63. The electric motor 67 is driven by electrical power supplied from the power source 68 via the driving unit 65. A rotational torque is transmitted via the driving shaft of the electric motor 67 to the load 69. The motor 12 of the present invention can be used as the electric motor 67.

For example, a laser printer can be given as an example of the electronic apparatus 61. In this case, a paper feed roller corresponds to the load 69. The motor 12 of the present invention may be mounted together with various electronic components on the wiring board 11 that is horizontally provided in a main body case of the laser printer. In the motor 12, a gear (not shown) can be fixed to a lower portion of the driving shaft 18 that passes through the wiring board 11 and extends downward, and this gear and a gear provided at the paper feed roller can be coupled to each other via a gearbox (not shown) functioning as a deceleration mechanism. The motor 12 of the present invention has a high driving efficiency and excellent precision in detecting the rotational speed, and, thus, paper can be sent efficiently and precisely while suppressing non-uniform rotation, noise, and the like, and a laser printer can be realized that can perform accurate printing without print position shift or the like.

According to the present invention, it is possible to provide a motor that has an improved precision in detecting the rotational speed while maintaining efficient driving. Thus, the present invention is preferable for a motor that is used in electronic apparatuses such as laser printers, laser copiers, and the like. Here, the motor of the present invention is not limited to these, and can be used widely as a motor that is required to have a highly precise rotation.

The embodiments described above are solely intended to elucidate the technological content of the present invention, and the present invention is not limited to or by these specific examples alone. Various modifications are possible within the spirit of the invention and the scope of the claims, and the present invention should be interpreted broadly.

What is claimed is:

1. A motor, comprising:
a stator that is mounted on a substrate and on whose outer circumference a plurality of magnetic poles are arranged at a first predetermined interval; and
a rotor that is rotatably disposed around the stator;
wherein an inner circumferential face of the rotor is provided with a magnet magnetized to have opposite polarities at a second predetermined interval in a direction opposing the stator, and magnetized to have opposite polarities at a third predetermined interval in a direction opposing the substrate,
each of outer circumferential ends of the plurality of magnetic poles of the stator is provided with a first extended portion that extends from a magnetic pole base to the substrate side, and a second extended portion that extends from the magnetic pole base to a side opposite the substrate side, and
a face of the substrate opposing the rotor is provided with a FG pattern including a main pattern and a cancellation pattern outside an outer circumferential face of the stator such that the FG pattern opposes the magnet.

2. The motor according to claim 1, wherein a distance from a tip end of the first extended portion to the magnet is larger than a distance from a tip end of the second extended portion to the magnet.

3. The motor according to claim 2, wherein the first extended portion is inclined such that a distance to the magnet increases as the tip end of the first extended portion is approached.

4. The motor according to claim 2, wherein the number of layers of plate-shaped members constituting the first extended portion is smaller than the number of layers of plate-shaped members constituting the second extended portion.

5. The motor according to claim 2,
wherein the first extended portion is configured from a plurality of plate-shaped members, and
the plurality of plate-shaped members have a height from the magnetic pole base that increases as the distance from the magnet increases.

6. The motor according to claim 1, wherein a height of the first extended portion from the magnetic pole base is lower than a height of the second extended portion from the magnetic pole base.

7. The motor according to claim 2, wherein an end portion of the magnet on the substrate side is projected further toward the substrate side than a tip end of the first extended portion is.

8. An electronic apparatus, comprising:
a main body case;
a driven member that is provided in the main body case; and
a motor that is coupled to the driven member;
wherein the motor is the motor according to claim 1.

* * * * *